United States Patent [19]

Peet, II

[11] Patent Number: 4,969,358

[45] Date of Patent: Nov. 13, 1990

[54] ELECTRONIC ALTIMETER/BAROMETER

[75] Inventor: William J. Peet, II, West Allenhurst, N.J.

[73] Assignee: Peet Bros. Company, Inc., West Allenhurst, N.J.

[21] Appl. No.: 398,766

[22] Filed: Aug. 25, 1989

[51] Int. Cl.$^5$ ............................ G01L 7/12; G01L 7/20
[52] U.S. Cl. ......................................... 73/384; 73/4 R
[58] Field of Search ............... 73/384, 386, 4 R, 385, 73/387

[56] References Cited

U.S. PATENT DOCUMENTS 3,180,152  4/1965  Metzger et al. ..................... 73/384
3,726,138  4/1973  Kosakowski et al. ............... 73/384

Primary Examiner—Donald O. Woodiel
Attorney, Agent, or Firm—Robert Skolnik

[57] ABSTRACT

A combined altimeter/barometer instrument is provided with setting means which can be actuated in two different modes, i.e., in a pressure level setting mode so as to set the instrument to a known sea-level pressure, or in an altitude setting mode to a known altitude. Either setting mode will bring both displays to the correct value. However, one or another of the displays is "locked" at the set value depending upon the setting mode used. Preferably, where the pressure setting mode is employed, the altitude display is locked after setting, so that the instrument acts solely as a barometer to display changes in sea-level pressure, while continuing to display the altitude prevailing at the time of setting. Where the altitude setting mode is used, the sea-level pressure display is locked. The instrument acts as an altimeter and assumes that the sea-level pressure remains constant at the value prevailing during setting.

7 Claims, 1 Drawing Sheet

ELECTRONIC ALTIMETER/BAROMETER

FIELD OF THE INVENTION

This invention relates to electronic aneroid altimeter/barometer instruments that can display altitude and sea-level pressure. The instruments can be calibrated according to known altitude or known sea-level pressure. However, after such calibration, the instruments do not differentiate between weather related changes in pressure and those caused by changes in altitude.

DESCRIPTION OF THE PRIOR ART

A mechanical aneroid barometer is an instrument that senses atmospheric pressure impressed upon it, known as absolute pressure. Some such instruments for scientific use directly display absolute pressure. More commonly, absolute barometric pressure is translated into sea-level pressure, which is the atmospheric pressure that would prevail at sea-level, given the same weather conditions. In order to display sea-level pressure, an aneroid barometer must be calibrated for the exact altitude at which it will be used. This is a semi-permanent mechanical adjustment typically accomplished by an adjusting screw. Inasmuch as the interrelationship of altitude, sea-level pressure and absolute pressure is known, some aneroid barometers provide altitude calibration marks for the adjusting screw. Said calibration marks permit calibration to be made by setting in the known altitude if the exact sea-level pressure is not known. After being calibrated for its location, a mechanical aneroid barometer can continuously sense changes in absolute pressure at that location and display them as changes in sea-level pressure.

Likewise, an aneroid altimeter is an instrument that senses atmospheric pressure impressed upon it. However aneroid altimeters interpret changes in absolute pressure as changes in altitude. In order to display altitude accurately, such instruments must periodically be calibrated for existing weather conditions. This is accomplished by adjusting the altitude reading at places of known elevation. Some aneroid altimeters, especially those used in aircraft, provide an adjustment means calibrated in units of pressure, such that the altimeter can be calibrated by setting in a known sea-level pressure reading.

An orometer is a mechanical aneroid instrument having both a pressure scale and an altitude scale upon which needle position and movement can be read, thereby combining certain functions of an aneroid barometer and an aneroid altimeter. Although orometers have been known for many years, existing instruments still compromise the utility of the individual instruments they combine. For example, existing orometers do not provide direct reading of sea-level pressure at the needle position. One must first correct the altitude reading, then read sea-level pressure at the zero altitude graduation mark.

In recent years, comparable electronic instruments have been designed that more fully combine the capabilities of an aneroid barometer and an aneroid altimeter. Such electronic altimeter/barometers can directly display absolute pressure, sea-level pressure and altitude. However, like their mechanical predecessors, these instruments are limited by not being able to discern whether a given change in absolute pressure resulted from a change in altitude or a change in weather conditions. Consequently, erroneous values are displayed under various circumstances, leading to operator confusion and dissatisfaction. For example, the altitude reading of a stationary instrument may vary up and down many hundreds of feet as high and low pressure systems move through the region. A hiker, having adjusted the sea level pressure of his instrument, may find that setting changed by 0.5 inches of mercury after he hikes up or down a 500 foot hill.

Electronic versions of such instruments typically include an altitude display (in units of feet or meters) and a sea-level pressure or "barometer reading" display (in units such as millibars, in.Hg., etc.). Both of these displays are responsive to the absolute atmospheric pressure exerted on the instrument. The instrument typically includes provisions for setting so that when the instrument is placed in service, these displays can be adjusted to the correct values, i.e., to reflect the known altitude above sea level at the instrument location and also to reflect the proper value of sea-level pressure. After setting however, the instrument does not differentiate between changes in absolute atmospheric pressure caused by changes in sea-level pressure and changes in atmospheric pressure caused by movement of the instrument to a different altitude. Thus, as the absolute atmospheric pressure on the instrument changes for any reason, the altitude and the sea-level pressure values displayed by the instrument both change.

Re. 26,696 patent to Daleo discloses an aircraft altimeter which senses a reference pressure by a means other than the altimeter and sets it into the altimeter. In one example, the local airport barometric pressure is set into the altimeter. In another example, a standard value is used. In still another case, dual altimeter settings are provided with standard surface pressure and the non-standard reference pressure. The reference pressure is set as a baseline about which the barometric pressure is measured and displayed.

U.S. Pat. No. 3,747,409 to Argentieri discloses an aircraft altimeter employing a display construction employing indicia bearing metallic tape.

U.S. Pat. No. 4,133,409 to Holtam, et al. relates to an aircraft altimeter where ambient pressure is set into the apparatus.

SUMMARY OF THE INVENTION

In accordance with my invention, two distinct operating modes are provided, a barometer mode and an altimeter mode. In either mode, the instrument calculates and can display sea-level pressure after the operator adjusts the altitude display. Likewise, it calculates and can display altitude after the operator adjusts the sea-level pressure display. In addition, in the preferred embodiment of my invention, an automatic mode is provided in which the instrument functions in an altimeter mode when motion is sensed and in a barometer mode after no motion has been sensed with a set period of time.

Barometer mode would be selected when the instrument is to remain in one location for a period of time and be used to observe changes in sea-level pressure. In barometer mode, the altitude display is uneffected by changes in absolute pressure. Instead, it is held constant at one of three values: its value when barometer mode was selected; the value calculated after known sea-level pressure is entered; or the value to which the operator adjusts it. Said fixed altitude display is distinguished as by flashing on and off or by concurrent display of an identifying label.

Altimeter mode would be selected when the instrument is to be moved about and be used to observe changes in altitude. In altimeter mode, the sea-level pressure display is uneffected by changes in absolute pressure. Instead it is held constant at one of three values: its value when the altimeter mode was selected; the value calculated after known altitude is entered; or the value to which the operator adjusts it. Said fixed sea-level display is distinguished as by flashing on and off or by concurrent display of an identifying label.

Automatic mode would be selected when altimeter mode would otherwise be selected and when movement of the instrument from place to place would be such as to activate the motion sensor.

In the preferred embodiment of my invention, a mode key is provided to select in which of said modes the instrument shall function. The existing mode is suitably displayed to the operator.

A principal object of my invention is the provision of a combined electronic altimeter/barometer which can, at the operator's election, treat changes in absolute pressure as resulting exclusively from a change in weather conditions or as resulting exclusively from a change in altitude.

Another object of my invention is the provision of a combined altimeter/barometer with two distinct operating modes, a barometer mode and an altimeter mode and an automatic mode in which the instrument switches between barometer mode and altimeter mode.

Another object of my invention is the provision of an instrument which, in the barometer mode, calculates altitude immediately after the operator adjusts sea-level pressure and retains said approximate altitude constant for subsequent display.

A still further object of my invention is the provision of an instrument which, in the barometer mode, calculates sea-level pressure immediately after the operator adjusts the altitude display and retains said adjusted altitude value constant for subsequent display.

A still further object of my invention is the provision of an instrument which, in the altimeter mode, calculates altitude immediately after the operator adjusts the sea-level pressure display and retains said adjusted sea-level pressure value for subsequent display.

Another object of my invention is the provision of an instrument which, in the altimeter mode, calculates sea-level pressure immediately after the operator adjusts altitude and retains said seal-level pressure value constant for subsequent display.

A still further object of my invention is to distinguish an altitude value being held constant, either by concurrent display of a suitable label or by causing either the fixed or variable display of altitude to flash on and off.

BRIEF DESCRIPTION OF THE DRAWINGS

These as well as further objects and advantages of the invention will become apparent to those skilled in the art from a review of the following detailed specification of my invention reference being made to the accompanying drawings in which.

DETAILED DESCRIPTION OF THE INVENTION

Figure 1:
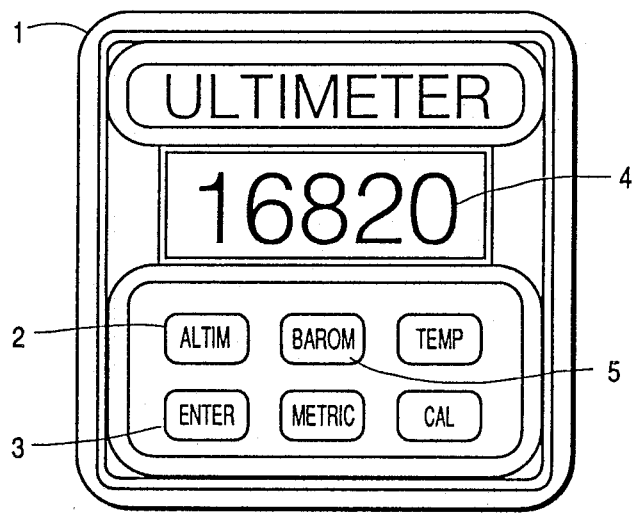
FIG. 1 is a front view of an instrument suitable for use with my invention.

FIG. 1 is a front view of an instrument suitable for use with my invention. This instrument is an electronic combined altimeter/barometer such as the commercially available ULTIMETER Model 6, from Peet Bros. Company, Inc. of West Allenhurst, New Jersey. This instrument employs an electronic transducer that senses absolute pressure, a microprocessor and liquid crystal data display, and a series of keys by which the operator can select and adjust displays.

More particularly, the instrument has a body 1 and an LCD display 2. A plurality of switch keys such as keys 2, 3 and 5 are also provided. Key 2 is denoted ALTIM, key 3 is labeled ENTER, and key 5 is labeled BAROM. The ALTIM and the BAROM keys respectively select the display of altitude or sea-level pressure. After either one of these is adjusted, via the ENTER key, the instrument calculates the other. Thereafter, any change in absolute pressured causes both the altitude display and the sea-level pressure display to change. Other keys are provided in the ULTIMETER instrument as shown in FIG. 1 including the METRIC, CAL, and TEMP keys.

Figure 2:
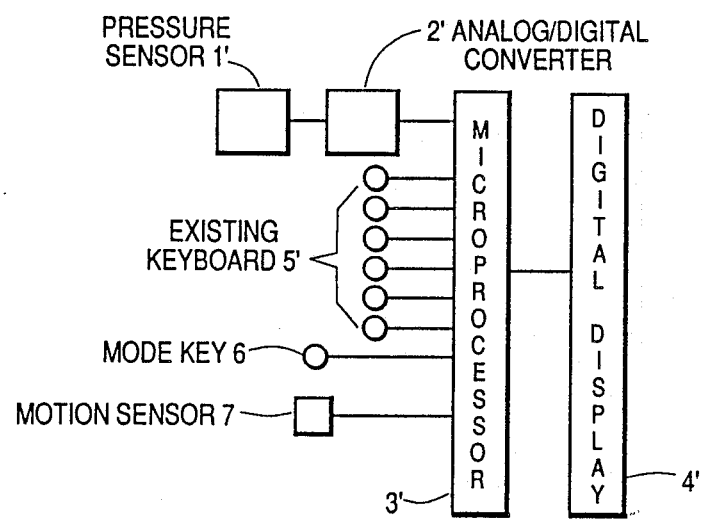
FIG. 2 is a block diagram of the circuit employing my invention.

FIG. 2 is a block diagram of the circuitry employed in the instrument of FIG. 1 as modified in accordance with my invention. More particularly, the instrument 1 incorporates a microprocessor 10 having its output connected to display 11. The microprocessor 10 has inputs from the keyboard 12, a pressure sensor 8 which develops (via analog/digital converter 9) a signal indicative of pressure.

My invention requires modifications to the instrument described above by the addition of a mode key 6 connected to microprocessor 10. This mode key is used to select altimeter mode or barometer mode. With the addition of the mode key, indicia are added to the display to indicate which mode has been selected. Each time the mode key 6 is actuated, the instrument switches from one mode to the other.

The mode key 6 may also be used to select automatic mode and the instrument's microprocessor 10 is then responsive to the output of a motion sensor 7. In the preferred embodiment of my invention, the motion sensor is the commercially available mercury switch device manufactured by Signal Systems International, Inc., of Lavallette, New Jersey, Series 2008-4.

The microprocessor 10 may be programed in accordance with the skill in the art to respond to the mode key 6 and the motion sensor 7 to perform the functions required in accordance with my invention as described herein.

The invention provides two distinct operating modes, a barometer mode and an altimeter mode. In addition, an automatic mode is also provided in which the instrument switches between functioning as in the barometer mode and functioning as in the altimeter mode.

In barometer mode, the altitude display is uneffected by changes in absolute pressure. Instead, it is held constant at one of three values: its value when barometer mode was selected; the value calculated after known sea-level pressure is entered; or the value to which the operator adjusts it in order to obtain a calculated sea-level pressure reading. The fixed altitude display is distinguished as by flashing on and off or by concurrent display of an identifying label.

In altimeter mode, the sea-level pressure display is uneffected by changes in absolute pressure. Instead, it is held constant at one of three values: its value when altimeter mode was selected; the value calculated after known altitude is entered; or the value to which the operator adjusts it in order to obtain a calculated altitude reading. The fixed sea-level display is distinguished as by flashing on and off or by concurrent display of an identifying label.

In automatic mode, provision is made for the microprocessor to sense motion of the instrument by means of motion sensor 7 mounted within the instrument case 1. The motion sensor 7 in the absence of motion presents an open circuit to the microprocessor 10. When the instrument is being moved about, the motion sensor intermittently presents a closed circuit to the microprocessor.

Any momentary closure of the sensor 7 indicates motion of the instrument 1. Upon sensing such change, microprocessor 10 causes the instrument to function as though in the altimeter mode. When no motion is detected within a set period of time, such as five minutes, microprocessor 10 will cause the instrument to function as though in barometer mode.

When the instrument is in altimeter mode, the user can adjust the altitude reading to the correct value, or can cause the instrument to calculate altitude by entering the correct sea-level pressure. In either event, subsequent changes in absolute pressure will cause the altitude reading to change, but will not alter the sea-level pressure display.

When the instrument is in the barometer mode, the user can adjust the sea-level pressure reading to the correct value, or can cause the instrument to calculate sea-level pressure by entering the correct altitude. In either event, subsequent changes in absolute pressure will cause the sea-level pressure reading to change, but will not alter the altitude display.

This arrangement provides for easy use by unskilled individuals and tends to minimize fallacious readings that confuse and dissatisfy users.

Additional accuracy can be obtained by automatically correcting the instrument to compensate for diurnal pressure changes. It is known that at sea-level, pressure changes of 0.01 in.Hg. per hour occur at certain times during the day. The change is less at higher elevations. In middle latitudes, such as the United States, the pressure increases between 5:00 and 9:00 am and between 5:00 and 9:00 pm. The pressure decreases between 11:00 am and 3:00 pm and between 11:00 pm and 3:00 am. In electronic altimeter/barometers having clock functions, the programming of the microprocessor is modified to introduce the appropriate correction values at one hour after the above times for a given range of altitudes.

It will be apparent that modifications may be made by employing different means to select modes or serve as the motion sensor without departing from the spirit and scope of my invention; accordingly, what is sought to be protected is set forth in the appended claims.

I claim:

1. An electronic apparatus comprising: means to sense absolute atmospheric pressure impressed upon said apparatus; computing and display means connected to said sensing means for interpreting changes in said absolute atmospheric pressure and displaying them selectively, as changes in altitude or changes in sea-level pressure; adjustment means coupled to said computing and display means for adjusting said apparatus by entering either known sea-level pressure or known altitude; said computing means calculating approximate altitude after said known sea-level pressure is entered and approximate sea-level pressure after said known altitude has been entered; control means connected to said computing means for maintaining either said sea-level pressure or said altitude constant, while permitting the other variable to vary according to changes in said absolute atmospheric pressure.

2. The electronic apparatus of claim 1 further including means in said computing means for automatically selecting whether sea-level pressure or altitude is to be held constant.

3. The electronic apparatus of claim 1 further including motion sensing means connected to said computing means for generating a control signal if said apparatus is moved.

4. The electronic apparatus of claim 3 wherein said the altitude reading is held constant if said motion sensor does not generate said control signal after a predetermined period of time.

5. Apparatus for calibrating a combined barometer/altimeter instrument comprising: display means for displaying altitude or barometric pressure; setting means connected to said display means, said setting means having a first pressure level setting mode so as to set the instrument to a known sea-level pressure and a second altitude setting mode to set the instrument to a known altitude; said setting means locking the display at said first mode if said second mode selected or at said second mode, if said first mode is selected, whereby said instrument acts solely as a barometer to display changes in sea-level pressure, while continuing to display the altitude prevailing at the time of setting or said instrument acts as an altimeter and assumes that the sea level pressure remains constant at the value prevailing during setting.

6. A method for calibrating a combined barometer/altimeter instrument comprising the steps of: displaying altitude or barometric pressure; setting said display means to a first pressure level setting so as to set the instrument to a known sea level pressure or setting said display to a second altitude setting level to set the instrument to a known altitude; locking the display at said first mode if said second mode selected or at said second mode, if said first mode is selected, whereby said instrument acts solely as a barometer to display changes in sea-level pressure, while continuing to display the altitude prevailing at the time of setting or said instrument acts as an altimeter and assumes that the sea level pressure remains constant at the value prevailing during setting.

7. A combined electronic barometer/altimeter instrument comprising: display means for displaying altitude or barometric pressure; and means connected to said display means for automatically compensating said display means for diurnal pressure changes, said automatic compensating means including clock means connected to said display means for generating timing signals for controlling said diurnal pressure change compensation as a function of clock time.

* * * * *

UNITED STATES PATENT AND TRADEMARK OFFICE
CERTIFICATE OF CORRECTION

PATENT NO. : 4,969,358
DATED : November 13, 1990
INVENTOR(S) : WILLIAM J. PEET, II It is certified that error appears in the above—identified patent and that said Letters Patent is hereby corrected as shown below:

Column 6, line 41, cancel beginning with "6. A method for calibrating a combined barometer/" to and during "setting." in column 6, line 55, and insert the following claim:

6. A method for calibrating a combined barometer/ altimeter instrument comprising the steps of: displaying altitude or barometric pressure; in a first mode setting said display to a known sea-level pressure or in a second mode setting said display to a known altitude; locking the display of sea-level pressure if said second setting is selected or locking the display of altitude, if said first mode is selected, whereby said instrument acts solely as a barometer to display changes in sea-level pressure, while continuing to display the altitude prevailing at the time of setting or said instrument acts as an altimeter and assumes that the sea level pressure remains constant at the value prevailing during setting.

Signed and Sealed this

Twenty-eighth Day of April, 1992

*Attest:*

HARRY F. MANBECK, JR.

*Attesting Officer*      *Commissioner of Patents and Trademarks*